April 28, 1925.
L. C. REESE
COLLECTING DEVICE
Filed Sept. 6, 1924    2 Sheets-Sheet 1
1,535,544
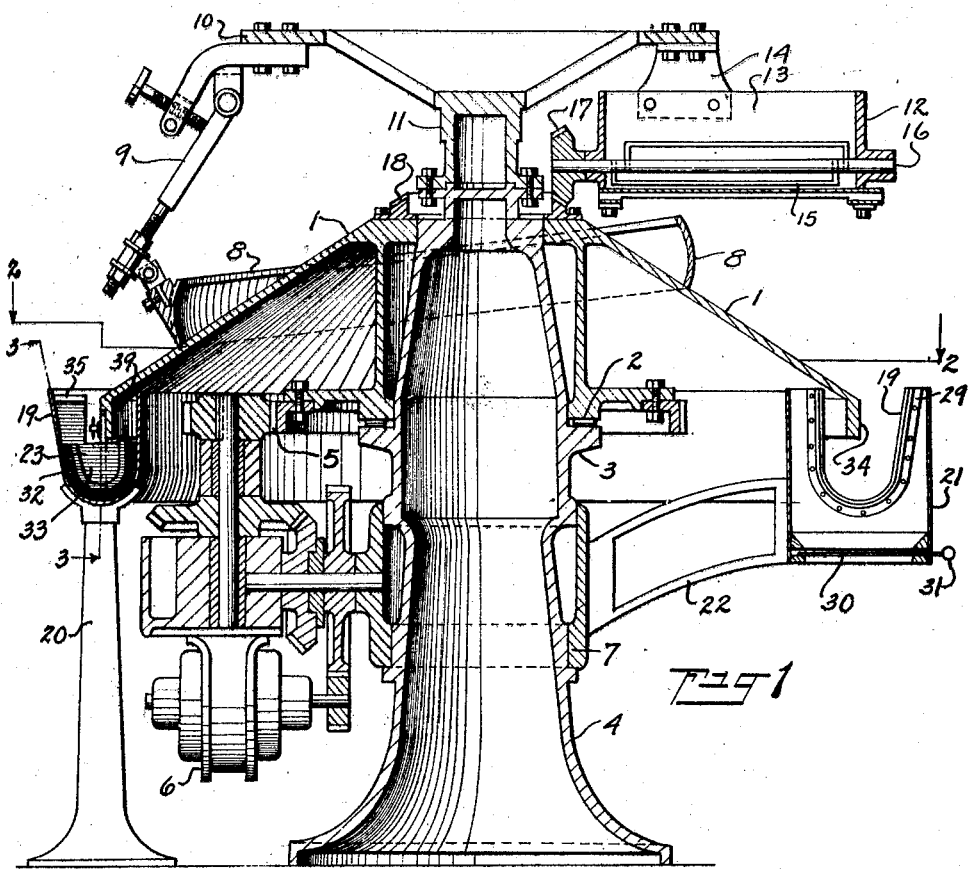
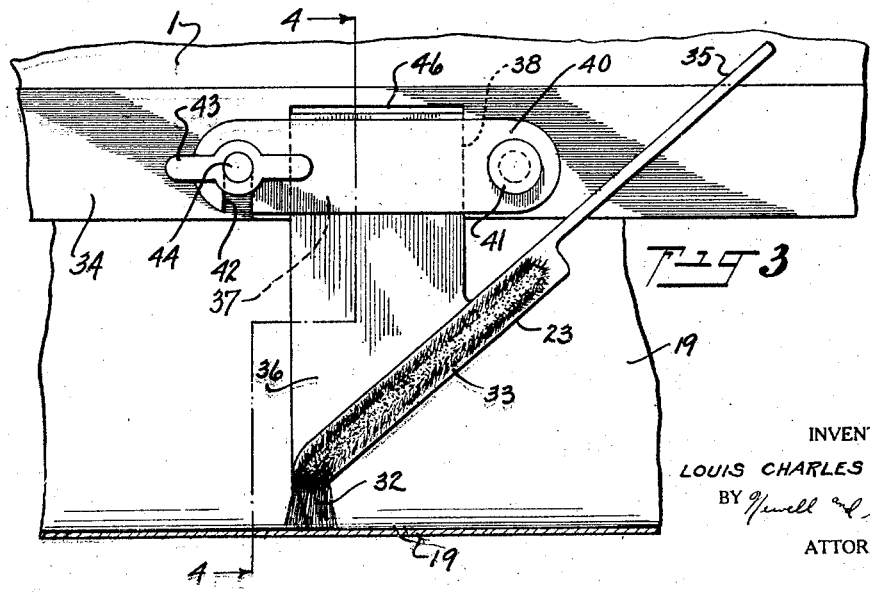
INVENTOR
LOUIS CHARLES REESE.
BY
ATTORNEYS

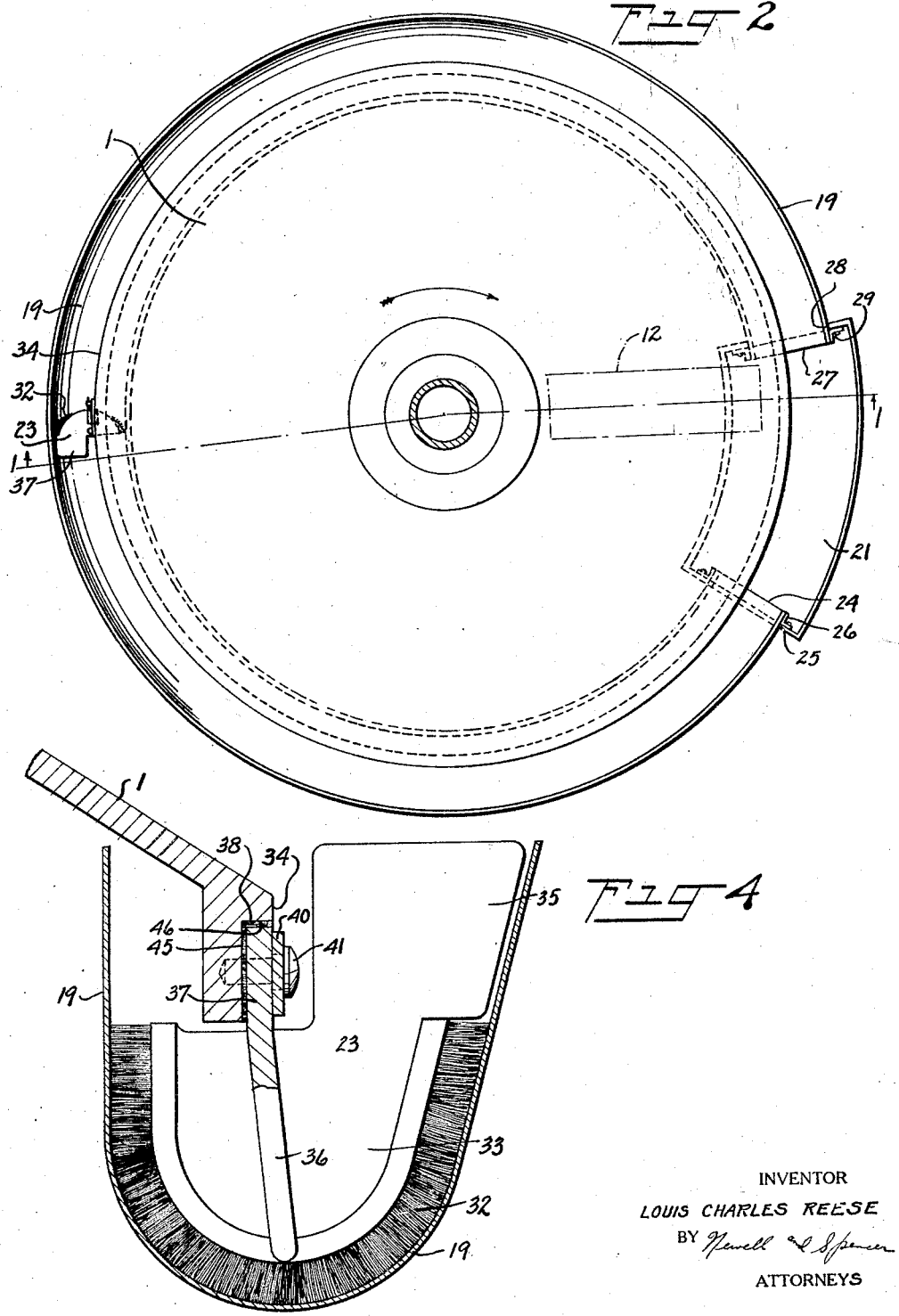

Patented Apr. 28, 1925.

1,535,544

UNITED STATES PATENT OFFICE.

LOUIS CHARLES REESE, OF SAGINAW, MICHIGAN, ASSIGNOR TO BAKER-PERKINS COMPANY, INCORPORATED, OF WHITE PLAINS, NEW YORK.

COLLECTING DEVICE.

Application filed September 6, 1924. Serial No. 736,242.

*To all whom it may concern:*

Be it known that I, LOUIS CHARLES REESE, residing at Saginaw, Michigan, have invented a certain new and useful Improvement in Collecting Devices, of which the following is a clear, full, and exact description.

This invention relates to devices for collecting and conserving materials which might otherwise be wasted in manufacturing operations, and is herein shown as embodied in a device for collecting flour or other material that falls from the rotating table of a dough-molding machine of the type in which the dough pieces are molded into shape by being passed between a revolving table and a stationary trough arranged spirally about the active surface of the latter. It will be understood, however, that the invention is not restricted to the illustrated embodiment or uses and that many features of the invention are of general utility.

An object of the invention is to provide a device for collecting and conserving materials, which may be attached to a machine such, for example, as the dough-molding machine herein illustrated and which will operate substantially automatically.

A further object of the invention is so to arrange the receiving and gathering elements of the device or its attachments as to take advantage of the movement of parts of the machine with which it is associated.

An important feature of the illustrated embodiment of the invention, in which a stationary receiving trough is arranged to receive the flour or other material dropping from a circular rotating table, is the connection to the rotating table of a collecting device (herein shown as a brush or sweeper) whereby the material dropping into the receiving trough is gathered together and moved to a common discharge point.

Another important feature of the invention is the arrangement of the point of discharge, and a suitable receptacle for receiving the material gathered by the brush or other gathering means, directly beneath the point at which the greater part of the material, the collection of which is the purpose of the present invention, is delivered to the rotating table, thereby permitting any excess amount of this, or any part of it which tends to drop directly from the table, to be immediately received into the collecting box or other suitable means for receiving and conserving the material.

Other objects and important features of the invention will appear from the following description and claims when considered in connection with the accompanying drawings, in which Fig. 1 is a cross sectional side view of such a dough molding machine;

Fig. 2 is a plan view of the table thereof showing the flour catch and its associated mechanism;

Fig. 3 is a view of the trough taken through the line 3—3 in Fig. 1 and showing the sweeping mechanism; and Fig. 4 is a view of the sweeping mechanism taken from the line 4—4 in Fig. 3.

The dough-molding machine shown in Fig. 1 comprises a molding table 1 rotatably supported by an annular roller bearing 2 mounted on a bracket 3 formed about a column 4 on which the molding machine rests. The table is rotated by means of a gearing 5 driven by an electric motor 6. The gearing and the motor are carried by an annular bracket 7 fixed about the middle of the column 4. A molding trough 8 spirally arranged about the table 1 is removably suspended from adjustable links 9 extending from the rim of a wheel 10 carried by a head block 11 on the column 4. A flour sprinkler 12 is suspended by a bracket 14 from the wheel 10. This sprinkler consists of a flour box 13 having a half cylindrical perforated or slit bottom and of a rod agitator 15 fixed to a shaft 16 which is provided with a pinion 17 meshing with an annular toothed ring 18 mounted on the flat annular top of the table 1. A trough 19 resting on standards 20 fixed in the floor and a box 21 supported by a bracket 22 upon annular brackets 7 provide a catch for the flour thrown off by the table. The trough 19 has a bottom part of semi-circular cross sectional form and said trough receives the peripheral edge of the table which projects below the top of the trough, the side walls of the trough being raised higher than to a point above the peripheral edge of the table. As shown, the side wall underneath the table is vertical and the outer wall is inclined in a direction away from the table. A sweeper 23 is attached to the rim of the rotating table 1 and drives the waste collected therefrom in the trough 19 into box 21. The trough is so shaped that when the sweeper is at work there will be no likelihood that dust will be stirred up by its action nor that any particle of flour pushed before the same will rise over the top of the trough. The end 24 of the trough is connected to the rim of a corresponding incision in the end wall 25 of box 21 by a flange 26, and the end 27 of the trough to the rim of a corresponding incision in the end wall 28 by a flange 29. In the bottom of the box 21 is a shutter 30 worked by means of a handle 31. Whenever a sufficient quantity of flour has accumulated in the box 21, the shutter 30 may be drawn open whereupon the flour contained in the box is dropped into a suitable receptacle and taken away.

The sweeper illustrated in Figs. 3 and 4 consists of a brush comprising bristles 32 and a back 33. The back 33 is shown as inclined in the direction of rotation of the table at an angle of about 45°. The bristles 32 are so mounted in the rim of the back 33 so as to point vertically toward the inner surface of the trough 19 and to sweep the same up to the height of the lower surface of the rim 34 of the table 1. An elongation 35 on the back 33 extends upwardly across that portion of the trough not covered by the table. The back 33 is provided with a handle 36 whose top 37 is adapted to fit in a corresponding recess 38 in the rim 34 of the table. Member 37, which is curved to conform with the curve of the rim 34, is held in the recess 38 by means of a bar 40 preferably made of a resilient material such as springy steel. This bar is rotatably mounted at one end by means of a screw 41 to the rim 34. It is provided at its opposite end with an incision 42 which fits over a set screw 44 in the rim 34 beyond the other end of the recess. A winged nut 43 upon screw 44 serves to tighten the bar 40 against the top 37 of the brush handle 36 and thus to keep the latter in its operative position. In order to secure the member 37 as firmly as possible in the recess 38, it is preferable to place a suitable packing 45 of India rubber, cardboard, or the like, at the back of the recess 38. If the bristles 32 have been worn away so as to necessitate the adjustment of the brush a packing 46 of the required thickness may be put between the top of the recess 38 and the top of the bar 37.

I claim—

1. In a machine of the kind described, a rotatable molding table, a stationary flour sprinkler located above the active surface of the table, a flour catch to collect the flour dropping from the table, said catch comprising a long and narrow stationary trough and a stationary box shorter but wider and deeper than the trough, the trough and the box being joined at their corresponding ends to form an annular structure beneath the edge of said table, and a sweeper fixed to the rim of the table and positioned so as to sweep the flour from said trough into said box, said box being positioned under that portion of the edge of the table above which the said flour sprinkler is situated and extending from there in the direction of the rotation of the table.

2. In a machine of the kind described, a rotatable molding table, a stationary annular structure underneath the edge of said table to collect the droppings therefrom, said structure comprising a long and narrow trough and a shorter but wider and deeper box joined at their corresponding ends, and a sweeper fixed to the rim of said table so as to incline in the direction of the rotation of the latter, and so arranged and adapted that it will drive the droppings collected in said trough from the trough into said box.

3. In a machine of the kind described, a rotatable molding table, a stationary annular structure beneath the edge of said table to collect the droppings therefrom, said structure comprising a long and narrow stationary trough and a shorter but wider and deeper box joined at their corresponding ends, and a brush fixed to the rim of the table to sweep said trough and comprising a back inclined in the direction of the rotation of the table, and bristles vertical to the surface along which the brush sweeps.

4. In a molding machine, a rotatable table, a stationary trough underneath the greater part of the edge of said table to receive a portion of the droppings therefrom, a stationary box filling the interval between the ends of the trough and of sufficient size to receive all the droppings from the trough, the trough and the box being joined at their corresponding ends so as to form a unitary collecting means for said droppings, a brush fixed to the table in such position that it will sweep the inner surface of the trough, a handle attached to said brush, a rim on said table, a recess in said rim to receive the top of said handle, and a spring bar fixed in a releasable manner to said rim to fasten said handle in said recess.

5. In combination, a rotatable table, a stationary sprinkler above the table to spread flour-like material on a portion thereof, a stationary box placed beneath the edge of said table and adjacent to the sprinkler and beyond it in the direction of rotation of the table to receive a portion of the material thrown off therefrom, a stationary trough ending in the ends of said box to receive the rest of the material thrown off from the table, and means attached to the table for sweeping the inner surface of the trough.

6. In combination, a rotatable table shaped like a truncated cone, a stationary sprinkler above a portion thereof, a stationary receptacle placed beneath the edge of the table adjacent to the sprinkler and beyond it in the direction of rotation of the table, a circular trough beneath the edge of the table and ending in the ends of said receptacle, the sides of said trough extending above the edge of said table, a sweeper attached to said table and so positioned that as the latter revolves it will sweep the inner surface of said trough, and a shutter in the bottom of said receptacle for emptying the same.

7. In combination with a rotating table, a stationary trough so positioned with respect to the table as to receive the peripheral edge thereof whereby loose material upon the table will be delivered to the trough, and means carried by the rotatable table and travelling through said trough to collect material delivered thereto and move the same through said trough.

8. In a dough molding machine of the type including a rotating table, a stationary trough adapted to receive the peripheral edge of the rotating table whereby loose material upon the rotating table will be delivered to the trough, and means carried by the rotatable table and movable through said trough in contact with the side walls thereof for moving the material discharged from the table into the trough through the trough.

9. In a dough molding machine of the type including a rotating table, a stationary trough adapted to receive the peripheral edge of the rotating table whereby loose material upon the rotating table will be delivered to the trough, means carried by the rotatable table and movable through said trough in contact with the side walls thereof for moving the material discharged from the table into the trough through the trough, and means associated with said trough for receiving the material collected therein by said material collecting means.

10. In a dough molding machine of the rotating type, a substantially circular trough so positioned with respect to the rotating table as to receive its peripheral edge whereby loose material on the rotating table will be delivered to said trough and said trough also having an enlarged section, and means carried by the rotatable table and movable through said trough to collect the loose material in the trough and deliver to the enlarged section thereof.

Signed at Saginaw, Michigan this 26th day of August 1924.

LOUIS CHARLES REESE.